Figure 1:
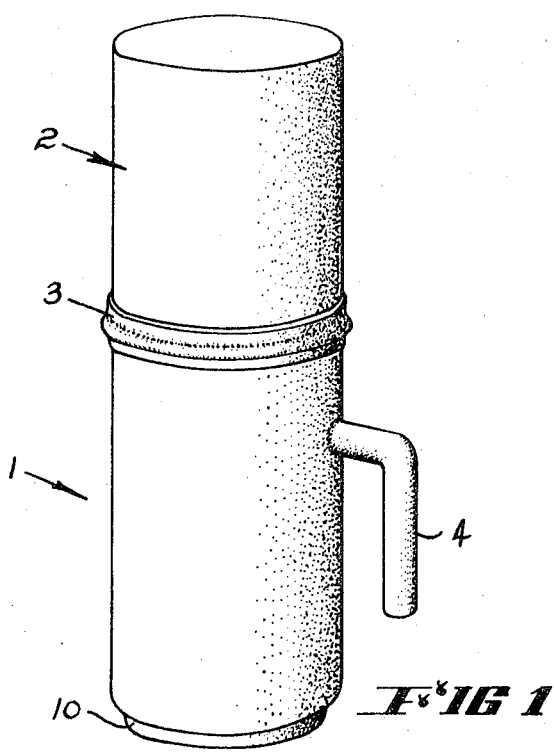

United States Patent
Zeleny et al.

[15] 3,655,175
[45] Apr. 11, 1972

[54] PACKAGE UNIT FOR REMOVING METAL FROM A SOLUTION OF THE METAL

[72] Inventors: Victor Vaclav Zeleny; Peter Charles Zeleny, both of Salisbury, Australia

[73] Assignee: Silver Recovery Equipment Pty. Limited, Salisbury, Australia

[22] Filed: July 28, 1969

[21] Appl. No.: 845,205

[30] Foreign Application Priority Data

July 29, 1968    Australia ............................41317/68

[52] U.S. Cl..................................266/22, 75/109, 75/121, 206/84, 23/285
[51] Int. Cl. .......................................................C22b 11/12
[58] Field of Search ..............75/108, 109, 118, 121; 266/22; 206/84; 23/285

[56] References Cited

UNITED STATES PATENTS

| | | | |
|---|---|---|---|
| 3,369,801 | 2/1968 | Hartman | 75/118 X |
| 1,226,611 | 5/1917 | Vandercook | 266/22 |
| 2,214,765 | 9/1940 | Holzwarth | 75/109 |
| 2,194,056 | 3/1940 | Quagliz | 75/109 |
| 2,905,323 | 9/1959 | Megesi | 75/109 X |

*Primary Examiner*—L. Dewayne Rutledge
*Assistant Examiner*—G. T. Ozakf
*Attorney*—Kinzer, Dorn and Zickert

[57] ABSTRACT

A package unit for recovering precious metals from their aqueous solutions. The package unit is constructed of plastics such that when the precious metal precipitating agent therein is spent, the unit is disposed in a precious metal recovery process.

7 Claims, 6 Drawing Figures

Patented April 11, 1972

3,655,175

PACKAGE UNIT FOR REMOVING METAL FROM A SOLUTION OF THE METAL

This invention relates to a package unit for removing metal from a solution of the metal, and is more particularly concurred with the removal and recovery of precious metals from their solutions.

It is known to recover metals from their solutions by ion exchange or electrodeposition methods, and also by replacing the metal with another metal higher in the electrometric force series of metals.

The present invention is aimed at the recovery of precious metals from solutions which are at present being allowed to run to waste because the cost of collecting small quantities of solution from numerous sources for recovery in one central plant would be uneconomic. A survey shows that many thousands even up to a million dollars worth of silver run to waste in Australia per annum.

These known methods and equipment are used in metallurgical operations for the purpose of metal recovery from solutions of the metal. Extensive plant and equipment are necessary because the solutions are mostly dilute solutions of the metal to be recovered and consequently large volumes have to be treated.

Such operations where precious metals are being lost are the smaller photographic processing laboratories, television broadcasting stations, printers, works laboratories, and precious metal electroplating plants and the like. The quantity of precious metal solutions dumped by these smaller laboratories and plants would be economic to recover if a suitable low cost package recovery unit was available.

It is the object of the present invention to provide a low cost package unit which may be used to recover precious metal from solutions at each location where these precious metal solutions are at present being dumped to waste.

According to this invention a package unit for recovering metal from a solution of the metal comprises a container, material in the container capable of removing metal from a solution of the metal by contacting said material with said solution during passage of said solution through said container.

A method of recovering precious metals from their solutions comprises passing the solution through a package unit comprising a plastic container, bobbins of iron shavings in the container, a bed of chips of calcite, limestone, magnesite or dolomite in the container through which the solution of precious metals pass prior to passing through the iron shavings to waste and transporting the package unit to a central site for recovery of the precious metal.

Figure 2:
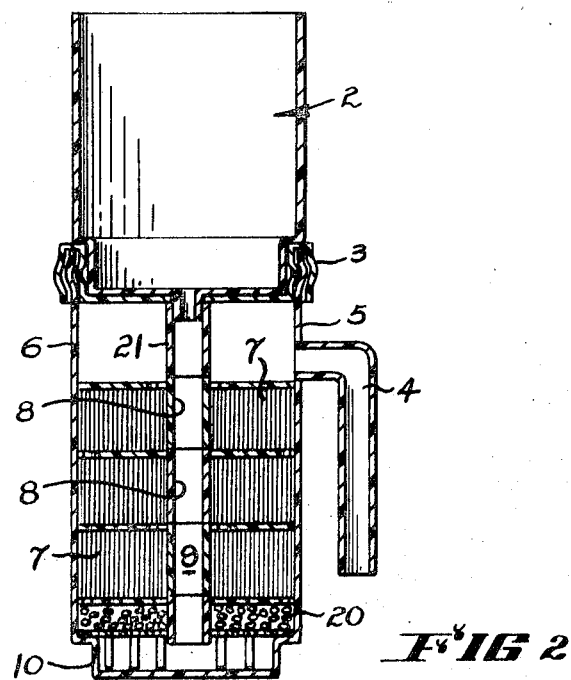
Figure 3:
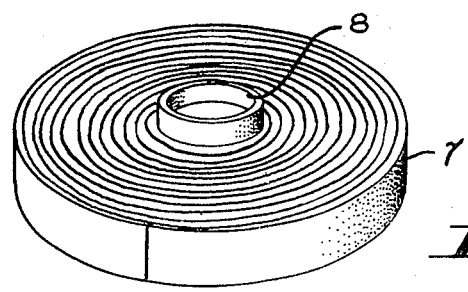
Figure 4:
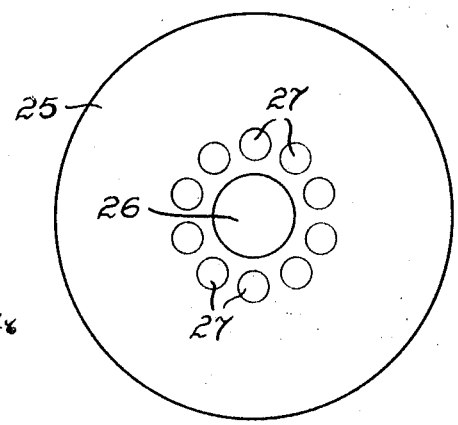
Figure 5:
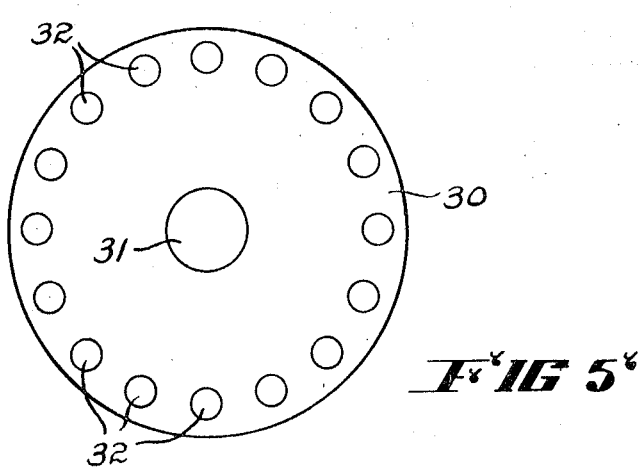
Figure 6:
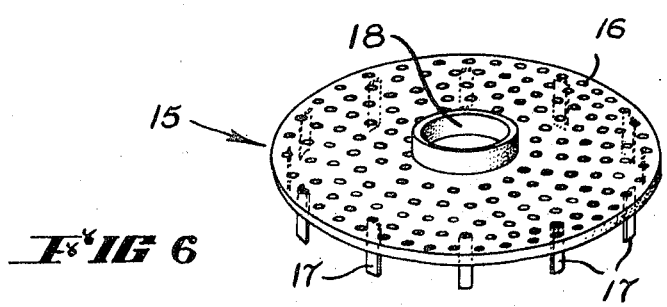

An embodiment of the invention is described hereafter in some detail with reference to and as illustrated in the accompanying drawings, in which:

FIG. 1 is a perspective view of a unit with a detachable cylindrical reservoir fitted above the unit, FIG. 2 is a diametrical sectional elevation of FIG. 1, FIG. 3 is a perspective view of a coil of wound fine metal turnings on a plastic tube which is used as the active precious metal precipitating material in the unit, FIGS. 4 and 5 are a plan view of spacers for locating between coils of the fine metal turnings in the unit, and FIG. 6 is a perspective view of a grid for supporting material in the unit reactive with solutions of the metal to be recovered.

In this embodiment the unit 1 with a reservoir 2 fitted thereto is shown in FIG. 1. The unit 1 is a cylindrical container measuring substantially 6½ inches in diameter and 12 inches high and is constructed from polyvinylchloride or polyethylene. The container 6 has a press-on detachable lid 3 with a central opening for use as the inlet for solutions to be treated by the unit. An outlet 4 for solutions treated by the unit to flow to waste is provided by a substantially right angle bent tube secured to an upper portion of the cylindrical walls 5, and surrounding an aperture in the cylindrical walls of the container 6.

In this embodiment the reactive metal used in the container to replace silver from its solution is fine iron turning 7 as a mat in strip form and wound on to a plastic tube 8 (FIGS. 2 and 3) until the outer diameter is substantially a press fit into the container 6.

The plastic tubes 8 upon which the fine iron turnings are wound fit one to another when installed in the container to provide a central channel 9 for incoming liquid to flow to the bottom of the container. If found necessary a smaller tube may be used in the channel 9 to keep the plastic tubes 8 in axial line with each other.

The bottom end of the cylindrical container is stepped down to a smaller cylindrical portion 10 approximately 1 inch deep and 5½ inches in diameter (shown in FIGS. 1 and 2). This portion 10 provides capacity for settling precious metal sludge and also to allow the incoming solution to be distributed upwardly substantially over the whole area of the coils of fine iron turnings 7.

A grid 15 consists of a perforated circular plastic member 16 with a series of supporting legs 17 extending from one side thereof and a tubular member 18 is secured to and extends outwardly from the central portion of the other side of the member 16. The member 16 is apertured within the area surrounded by the tubular member 18.

Chips 20 of calcite, limestone, magnesite or dolomite are carried on the perforated plastics member 16 of the grid 15 to a depth of approximately three-quarters of an inch.

Three coils of fine iron turnings 7 are pressed into the container 6 and a plastics tube 21 connects the plastics tube 8 of the upper iron turnings coil to the opening of the lid 3.

The foregoing construction completes the package unit 6 of this embodiment.

To improve contact of the solutions with the fine iron coils 7 spacers 25 and 30 (FIGS. 4 and 5) may be used between the coils 7. These spacers 25 and 30 would be of a diameter such that their outer circumferences contact the inside surface of the container 6.

As shown in FIG. 4 the spacer 25 has a large aperture 26 to fit the tube 8 of the coil 7 and adjacent to the large aperture 26 are a number of smaller spaced apertures 27.

As shown in FIG. 5 the spacer 30 has a large aperture 31 to fit the tube 8 of the coil 7 and near the periphery of the spacer are a series of smaller apertures 32.

By installing spacer 25 between the top iron coil and the second iron coil and spacer 30 between the second iron coil and the bottom iron coil and spacer 30 above and contacting the top coil, the solution passing through the unit will be controlled to travel the longest distance through the iron coils.

It has been found that improved recovery of silver from oxidizing or bleaching solutions having an acid pH value (for example: solutions resulting from reversal or direct positive processes for the production of positive films) is obtained by the use of a neutralizer such as calcite, calcium hydroxide, magnesite and the like.

It has also been found that where the package unit has to deal with bulk solutions resulting from batch process work the reservoir 2 allows the flow through the unit to be controlled at a flow rate for optimum recovery.

It will also be realized that to avoid loss of precious metal due to the unit becoming spent due to any of a number of reasons, two units may be coupled together to work in series.

A simple test for silver or gold in the solution passing from the unit is to use a piece of copper or zinc immersed in the stream which will soon show a deposit of the precious metal should the solution contain any. Of course other more delicate known tests may be used.

A package unit of this invention may be said to include a larger unit than the embodiment described.

The unit described in this embodiment is capable of recovering 50 to 80 ozs of silver or 90 to 140 ozs. of gold.

What we claim is:

1. A package unit for recovering precious metal from a solution containing the precious metal, the unit comprising a container constructed of a material unreactive with the metal solution; closely wound metal shavings in the container capable of removing metal from the solution of the precious metal by contacting said metal shavings with said solution during passage of said solution through said container, a central inlet for the liquid to pass downwardly through a passageway to the bottom of the container, a bed of neutralizing material of alkaline earth metal carbonates in the bottom of the container, whereby the solution passes firstly through the neutralizing material and thence upwardly through the closely wound metal shavings to waste.

2. A package unit according to claim 1 where the metal shavings for removing the precious metal from its solution are iron shavings.

3. A package unit according to claim 1 where the bed of neutralizing material is a bed of lump calcite, limestone, magnesite, dolomite or calcium hydroxide through which the incoming solution first passes before contacting the material for removing metal from its solution.

4. A package unit according to claim 1 wherein the metal shavings are fine and wound on a plastic tube until the outer diameter is a substantially press fit into the cylindrical container.

5. A package unit according to claim 4 wherein more than one set of wound metal shavings is used in the unit.

6. A package unit according to claim 4 wherein the fine metal shavings are wound on bobbins separated from each other by apertured spacers, whereby the spacers act as baffles to thereby prevent short circuitry of liquid as it flows upwardly in the unit.

7. A package unit according to claim 6 wherein the bed of neutralizing material is calcite, limestone, magnesite, dolomite or calcium hydroxide supported beneath the metal shavings on a perforated member itself supported in spaced relation on and above the bottom wall of the container.

* * * * *